United States Patent
Johnson et al.

(10) Patent No.: US 12,531,255 B2
(45) Date of Patent: Jan. 20, 2026

(54) THERMO-ELECTROCHEMICAL CONVERTER

(71) Applicant: JTEC Energy, Inc., Atlanta, GA (US)

(72) Inventors: Lonnie G. Johnson, Atlanta, GA (US); David Ketema Johnson, Douglasville, GA (US); Andrew Ashford Knight, Norcross, GA (US); Tedric D. Campbell, Lithia Springs, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 728 days.

(21) Appl. No.: 17/797,572

(22) PCT Filed: Feb. 12, 2021

(86) PCT No.: PCT/US2021/017745
§ 371 (c)(1),
(2) Date: Aug. 4, 2022

(87) PCT Pub. No.: WO2021/216171
PCT Pub. Date: Oct. 28, 2021

(65) Prior Publication Data
US 2023/0056025 A1    Feb. 23, 2023

Related U.S. Application Data

(60) Provisional application No. 62/976,764, filed on Feb. 14, 2020.

(51) Int. Cl.
*H01M 8/04007* (2016.01)
*H01M 8/04089* (2016.01)
*H01M 8/1004* (2016.01)

(52) U.S. Cl.
CPC ... *H01M 8/04074* (2013.01); *H01M 8/04104* (2013.01); *H01M 8/1004* (2013.01)

(58) Field of Classification Search
CPC ........ H01M 8/04074; H01M 8/04104; H01M 8/04432; H01M 8/1004
See application file for complete search history.

(56) References Cited

U.S. PATENT DOCUMENTS

| 7,160,639 B2 | 1/2007 | Johnson et al. |
| 7,943,250 B1 * | 5/2011 | Johnson ............ H01M 8/04014 205/345 |

(Continued)

FOREIGN PATENT DOCUMENTS

| JP | 2017532718 A | 11/2017 |
| WO | 2016025372 A1 | 2/2016 |

OTHER PUBLICATIONS

International Search Report issued Jan. 26, 2022 in International Application No. PCT/US2021/017745.

(Continued)

*Primary Examiner* — Christopher P Domone
(74) *Attorney, Agent, or Firm* — Panitch Schwarze Belisario & Nadel LLP

(57) ABSTRACT

A thermo-electrochemical converter is provided. The converter includes a working fluid, coupled first and second membrane electrode assemblies (MEA), first and second heat transfer members, a heat sink and a heat source. Each MEA includes a first porous electrode operating at a first pressure, a second porous electrode operating at a second pressure which is higher than the first pressure, and an ion conductive membrane sandwiched therebetween. The first MEA compresses the working fluid and the second MEA expands the working fluid. The first heat transfer member is coupled to and thermally interfaces with a low-pressure electrode of the first MEA. The second heat transfer member is coupled to and thermally interfaces with a low pressure electrode of the second MEA. The heat sink is coupled to the (Continued)

low-pressure side of the first MEA and the heat source is coupled to the low-pressure side of the second MEA.

7 Claims, 4 Drawing Sheets

(56) References Cited

U.S. PATENT DOCUMENTS

| | | |
|---|---|---|
| 2010/0132386 A1 | 6/2010 | Bahar |
| 2012/0064419 A1 | 3/2012 | Johnson |
| 2017/0237105 A1* | 8/2017 | Johnson ................ H01M 8/182 |
| | | 429/471 |
| 2018/0108960 A1* | 4/2018 | Johnson ................ F25B 41/10 |
| 2020/0014053 A1 | 1/2020 | Johnson |

OTHER PUBLICATIONS

Written Opinion issued Jan. 26, 2022 in International Application No. PCT/US2021/017745.

Ni et al., "Conceptual design of AMTEC demonstrative system for 100 t/d garbage disposal power generating facility,", 2000, p. 1295-1299, Report Number(s) AIAA 2000-3032, American Institute of Aeronautics and Astronautics.

Hirschenhofer et al., Fuel Cell Handbook, 4th Edition, p. 2-5 (1999).

Int'l Preliminary Report on Patentability issued Aug. 25, 2022 in Int'l Application No. PCT/US2021/017745.

Office Action issued Oct. 23, 2023 in JP Application No. 2022-549209 with English Translation.

European Search Report issued Oct. 27, 2023 in EP Application No. 23182443.

* cited by examiner

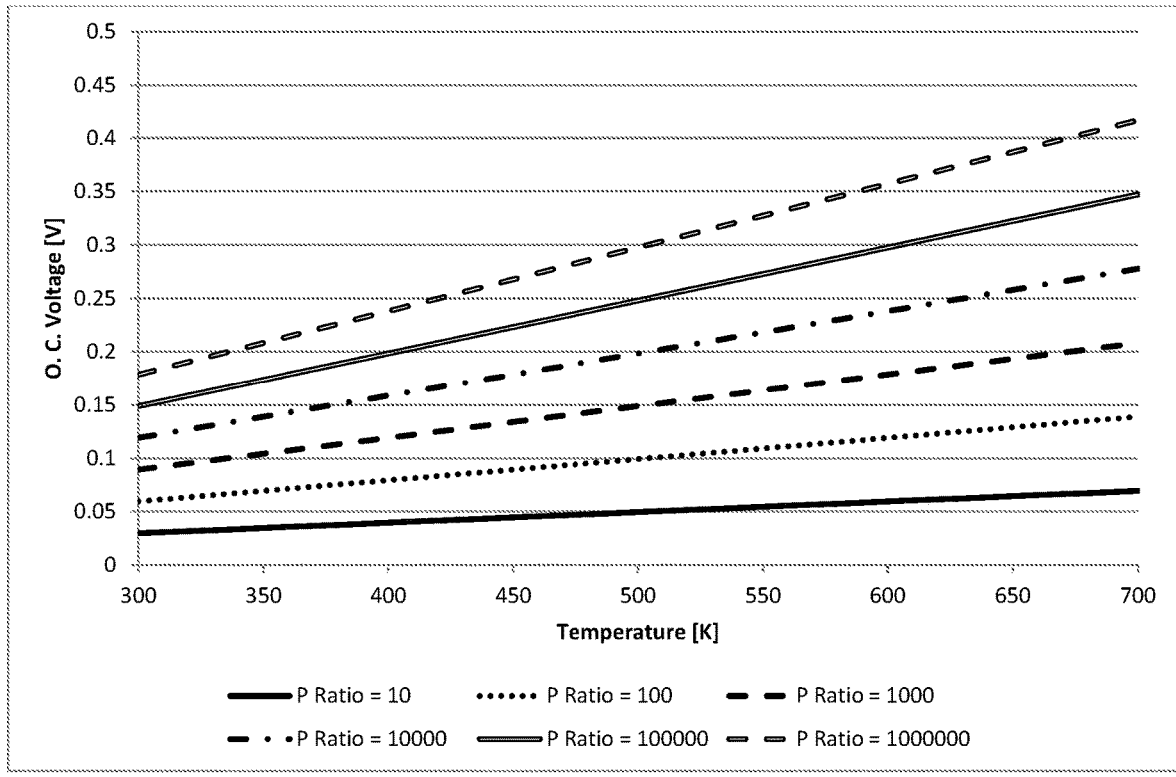
Fig. 1
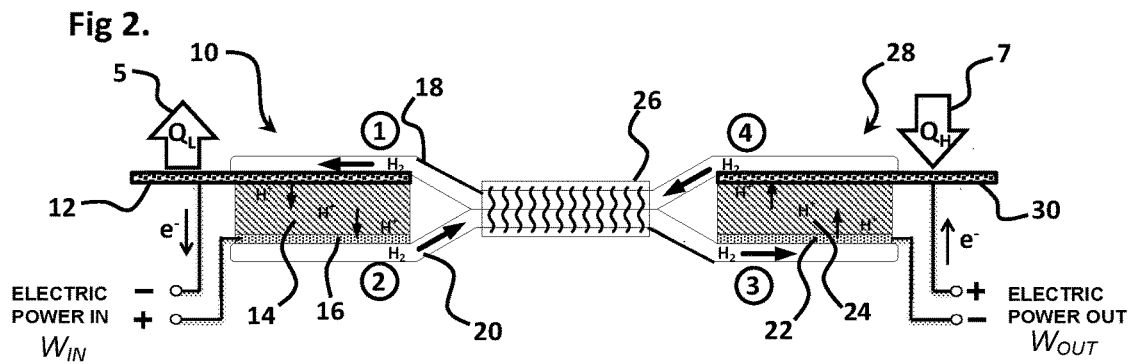

THERMO-ELECTROCHEMICAL CONVERTER

CROSS-REFERENCE TO RELATED APPLICATION

This application is a Section 371 of International Application No. PCT/US2021/017745, filed Feb. 12, 2021, which was published in the English language on Oct. 28, 2021, under International Publication No. WO 2021/216171, which claims priority to U.S. Provisional Patent Application No. 62/976,764, filed Feb. 14, 2020, the disclosures of each of which are incorporated herein by reference in their entireties.

BACKGROUND OF THE INVENTION

The present invention relates to the conversion of heat energy to electrical energy or electrical energy to heat energy utilizing a heat engine having a pair of electrochemical cells.

The conversion of heat energy or chemical energy to electrical energy, or visa-versa electrical energy to heat energy or chemical energy, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amounts of available reactants that may be contained therein. Although such cells can be designed to be recharged by applying a reverse polarity current/voltage across the electrodes, such recharging requires a separate electrical source. Another downside of these conventional battery type electrochemical cells is that, during the recharging process, the cells are typically not usable.

Fuel cells have been developed in an effort to overcome problems associated with battery type electrochemical cells. In conventional fuel cells, the chemical reactants are continuously supplied to and removed from the electrochemical cell. In a manner similar to batteries, fuel cells operate by conducting an ionized species through a selective electrolyte which generally blocks passage of electrons and non-ionized species.

The most common type of fuel cell is a hydrogen-oxygen fuel cell which passes hydrogen through one of the electrodes and oxygen through the other electrode. The hydrogen ions are conducted through the electrolyte separator to the oxygen side of the cell under the chemical reaction potential of the hydrogen and oxygen. Porous electrodes on either side of the electrolyte separator are used to couple the electrons involved in the chemical reaction to an external load via an external circuit. The electrons and hydrogen ions reconstitute hydrogen and complete the reaction, while the oxygen on the oxygen side of the cell results in the production of water which is expelled from the system. A continuous electrical current is maintained by a continuous supply of hydrogen and oxygen to the cell.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A fundamental principle of the operation of all engines which employ a working fluid is that less work is required to compress the working fluid at low temperatures than that produced by expanding the working fluid at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for 100 t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, NV (Jul. 24-28, 2000), Collection of Technical Papers. Vol. 2 (A00-37701 10-44). Also see American Institute of Aeronautics and Astronautics, 190, p. 1295-1299. REPORT NUMBER(S)-AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature compared to other types of heat engines, because the alkali metal working fluid must remain above its melt temperature at all times as it moves through the cycle. Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system (disclosed in U.S. Pat. No. 7,160,639 filed Apr. 28, 2003) was developed. The typical JTEC system is a heat engine that includes a first electrochemical cell operating at a relatively low temperature, a second electrochemical cell operating at a relatively high temperature, a conduit system including a heat exchanger that couples the two cells together, and a supply of ionizable gas (such as hydrogen or oxygen) as a working fluid contained within the conduit system. Each electrochemical cell includes a Membrane Electrode Assembly (MEA).

More particularly, the JTEC heat engine includes a first MEA coupled to a high temperature heat source (i.e., a high temperature MEA), a second MEA coupled to a low temperature heat sink (i.e., a low temperature MEA), and a recuperative heat exchanger connecting the two MEAs. Each MEA includes a non-porous membrane capable of conducting ions of the working fluid and porous electrodes positioned on opposite sides of the non-porous membrane that are capable of conducting electrons.

Operation of the JTEC is just like any other engine. Take, for example, a jet engine, which includes a compressor and combustion chamber. The compressor stage pulls in air, compresses air, and supplies the compressed air to the combustion chamber. The air is heated in the combustion chamber and expands through the power stage. The power stage couples shaft work back to the compressor stage, thereby maintaining a continuous supply of compressed air. The difference in work generated by the power stage and that consumed by the compressor stage is the net work output by the jet engine. The primary difference between the JTEC and a jet engine, however, is that the turbine of a jet engine is mechanical and operates on the Brayton thermodynamic cycle, whereas the JTEC heat engine is a fully solid-state engine and operates on the more efficient Carnot equivalent Ericsson Thermodynamic cycle.

During operation of the JTEC, the working fluid passes through each MEA by releasing electrons to the electrode on the entering side, such that the ions can be conducted through the non-porous membrane to the opposite electrode. The working fluid is reconstituted within the opposite electrode as it re-supplies electrons to working fluid ions as they exit the membrane.

The low temperature MEA operates at a lower voltage than the high temperature MEA. The low temperature MEA compresses the working fluid (such as hydrogen or oxygen) at low voltage and the high temperature MEA stack expands the working fluid at high voltage. The difference in voltage between the two MEAs is applied across the external load. The working fluid circulates continuously inside the JTEC heat engine and is never consumed. The current flow through the two MEAs and the external load is the same.

Specifically, in the JTEC heat engine, a pressure differential is applied across each MEA with a load attached, thereby producing a voltage and current as the working fluid passes from high pressure to low pressure. The electron current is directed to the external load as electrons are stripped from the protons as they pass through the membrane, which is a proton conductive membrane (PCM). The JTEC system utilizes the electrochemical potential of the working fluid pressure applied across the PCM. More particularly, on the high-pressure side of each MEA and the low-pressure side of each MEA, the working fluid is oxidized resulting in the creation of protons and electrons. The pressure differential at the high temperature end forces the protons through the membrane causing the electrodes to conduct electrons through an external load, while the imposition of an external voltage forces protons through the membrane at the low temperature end. On the high-pressure side of each MEA and the low-pressure side of each MEA, the protons are reduced with the electrons to reform the working fluid.

Unlike conventional fuel cells, in which the hydrogen exiting the MEA stack would encounter oxygen and react with it producing water, there is no oxygen or water in the JTEC system. This process can also operate in reverse. Specifically, voltage and current may be applied to pump the working fluid from low pressure to high pressure. The reverse process is rather similar to that of using a MEA to electrolyze water, wherein water molecules are split and protons are conducted through the PCM, leaving oxygen behind on the water side. Hydrogen is often supplied at a high pressure to a pure hydrogen reservoir via this process.

In the JTEC engine, using hydrogen as the ionizable gas (i.e., the working fluid), the electrical potential due to a hydrogen pressure differential across the PCM is proportional to the natural logarithm of the pressure ratio, and can be calculated using the Nernst equation:

$$V_{OC} = \frac{RT}{2F}\ln(P_H/P_L), \qquad \text{Equation 1}$$

where $V_{OC}$ is open circuit voltage, R is the universal gas constant, T is the cell temperature, F is Faraday's constant, $P_H$ is the pressure on the high pressure side, $P_L$ is the pressure on the low pressure side, and $P_H/P_L$ is the pressure ratio. E.g., *Fuel Cell Handbook*, J. H. Hirschenhofer et al., 4$^{th}$ Edition, p. 2-5 (1999).

The voltage is linear with respect to temperature and is a logarithmic function of the pressure ratio. This linear relationship is depicted in FIG. 1, which is a plot of the Nernst equation for hydrogen-based generated voltage vs. temperature for several pressure ratios. At a pressure ratio of 10,000, for example, FIG. 1 depicts that when the temperature is high, the voltage is high and when the temperature is low the voltage is low, such that there is a linear relationship between these parameters.

The working fluid in the JTEC is compressed in the low temperature electrochemical cell by supplying current at a voltage that is sufficient to overcome the Nernst potential of the low temperature cell, thereby driving the working fluid from the low-pressure side of the membrane to the high-pressure side. On the other hand, the working fluid is expanded in the high temperature electrochemical cell as current (power) is extracted under the Nernst potential of the high temperature cell. Electrical current flow is generated as the working fluid expands from the high-pressure side of the membrane to the low-pressure side. As in any thermodynamic engine employing a working fluid and consistent with the nature of compressible gas, in the JTEC, a greater amount of work (electricity) is extracted during high temperature expansion than the work (electricity) input required for the low temperature compression. The difference in heat energy input to the engine to maintain constant temperature during high temperature expansion versus the heat energy removed to maintain constant temperature during low temperature compression is provided as the difference in electrical energy output by the high temperature expansion process versus that consumed by the low temperature compression process.

Consistent with the Nernst equation, the high temperature cell will have a higher voltage than the low temperature cell. Since the current (I) is the same through both cells, the voltage differential means that the power generated through the expansion of working fluid in the high temperature cell is higher than that generated in the low temperature cell. The power output by the high temperature cell ($V_{HT}*I$) is sufficient to drive the compression process in the low temperature cell ($V_{LT}*I$), as well as to supply net power output to an external load (($V_{HT}*I$)-($V_{LT}*I$)). This voltage differential provides the basis for the JTEC engine.

The JTEC heat engine offers a practical way of using available high barrier, low conductivity membrane materials to provide a thermo-electrochemical heat engine that can approximate an Ericsson cycle, that can operate over a wide range of heat source temperatures, and that eliminates the reliability and inefficiency problems associated with mechanical engines.

However, there are some drawbacks of the JTEC heat engine. For example, the design of the JTEC heat engine is complicated by the need for a large membrane/electrode surface area and by the need for a significant number of cells to be electrically connected in series to achieve practical output voltage levels. Specifically, unlike conventional fuel cells, where the open circuit voltage can be greater than 1.0 volts, the Nernst voltage from the hydrogen pressure differential across a MEA is in the range of only about 0.2 volts. As such, many cells will have to be connected in series to achieve useful output voltage levels.

Further, in order to achieve efficient energy conversion, the membranes must have good ion conductivity and high diffusion barrier properties, because diffusion of working fluid (such as hydrogen gas) under the pressure differential across the membrane results in reduced electrical output and efficiency. However, known and available membrane materials that have good ion conductivity, such as Nafion manufactured by the DuPont Corp., are polymers and generally have very poor molecular diffusion barrier properties. Conversely, known and available membrane materials that have high molecular diffusion barrier properties generally have relatively low ionic conductivity, such that use of these materials would result in high system impedance and high polarization losses.

Accordingly, the negative impact of low ion conductivity of available membrane materials remains a problem that limits power output of the JTEC heat engine. In particular, ion conductive resistance through the membranes is reflected as a reduction in output voltage, reduced efficiency and reduced power density. In conventional implementations of the JTEC heat engine, which are focused on closely approximating constant temperature expansion and compression processes to approximate the Ericsson cycle as means for maximizing efficiency, MEA activation energy and resistivity losses associated with membrane ion conductivity overwhelm the overall performance at the device level, particularly when operating on low grade, low temperature heat sources.

The heat engine of the present invention resolves these drawbacks. More particularly, the thermo-electrochemical converter of the present invention selectively implements a temperature gradient across each MEA to generate local thermogalvanic voltages which have opposite polarity to that of activation energy and resistivity loss voltages, thereby serving to locally minimize or negate their effect on output voltage, efficiency and power density.

BRIEF SUMMARY OF THE INVENTION

In one aspect, the present invention is directed to a thermo-electrochemical converter comprising a working fluid; a first membrane electrode assembly and a second membrane electrode assembly coupled to the first membrane electrode assembly, each of the first and second membrane electrode assemblies including a first porous electrode operating at a first pressure, a second porous electrode operating at a second pressure which is higher than the first pressure, and an ion conductive membrane sandwiched therebetween, the first membrane electrode assembly working to compress the working fluid and the second membrane electrode assembly working to expand the working fluid; a first heat transfer member coupled to the first porous electrode of the first membrane electrode assembly, the first heat transfer member thermally interfacing with and facilitating heat transfer from a surface constituting a low-pressure side of the first membrane electrode assembly; a second heat transfer member coupled to the first porous electrode of the second membrane electrode assembly, the second heat transfer member thermally interfacing with and facilitating heat transfer to a surface constituting a low-pressure side of the second membrane electrode assembly; a heat sink coupled to the low-pressure side of the first membrane electrode assembly; and a heat source coupled to the low-pressure side of the second membrane electrode assembly.

In another aspect, the present invention is directed to thermo-electrochemical converter comprising: an ionizable working fluid; at least one membrane electrode assembly including a first porous electrode, a second porous electrode and at least one ion conductive membrane configured to conduct ions of the ionizable working fluid sandwiched between the first and second porous electrodes; a first conduit operating containing the ionizable working fluid at a first pressure and a second conduit containing the ionizable working fluid at a second pressure which is higher than the first pressure, the first conduit being coupled to the first porous electrode and corresponding to a low-pressure side of the at least one membrane electrode assembly and the second conduit being coupled to the second porous electrode and corresponding to a high-pressure side of the at least one membrane electrode assembly; and a heat conductor coupled to the at least one membrane electrode assembly on the low-pressure side, the heat conductor coupling heat to and from substantially an entire surface of the membrane electrode assembly on the low-pressure side.

In another aspect, the present invention is directed to a method of converting heat into electrical energy. The method comprises providing a thermo-electrochemical converter comprising: a working fluid; a first membrane electrode assembly and a second membrane electrode assembly coupled to the first membrane electrode assembly, each of the first and second membrane electrode assemblies including a first porous electrode operating at a first pressure, a second porous electrode operating at a second pressure which is higher than the first pressure, and an ion conductive membrane sandwiched therebetween; a first heat transfer member coupled to the first porous electrode of the first membrane electrode assembly, the first heat transfer member thermally interfacing with and facilitating heat transfer from a surface constituting a low-pressure side of the first membrane electrode assembly; a second heat transfer member coupled to the first porous electrode of the second membrane electrode assembly, the second heat transfer member thermally interfacing with and facilitating heat transfer to a surface constituting a low-pressure side of the second membrane electrode assembly; a heat sink coupled to the low-pressure side of the first membrane electrode assembly; and a heat source coupled to the low-pressure side of the second membrane electrode assembly, the heat source being at an elevated temperature relative to the heat sink. The method further comprises compressing the working fluid at the first membrane electrode assembly, and expanding the working fluid at second membrane electrode assembly. Heat of compression generated as the working fluid is compressed at the first membrane electrode assembly is removed to the heat sink, with the removal of the heat of compression being enhanced by the first heat transfer member, such that a temperature gradient is produced which increases toward a high-pressure side of the first membrane electrode assembly and thermogalvanic voltage is generated which moves the working fluid in the same direction as voltage being applied to the first membrane electrode assembly for pumping of the working fluid such that decreased voltage is needed to drive compression of the working fluid at the first membrane electrode assembly. Electrical power is generated at the second membrane electrode assembly as the working fluid expands from a high-pressure side to the low-pressure side, with the application of heat from the heat source to the low-pressure side of the second membrane electrode assembly being enhanced by the second heat transfer member, such that a heat flux is produced in a direction opposite to a direction of the working fluid expanding through the second membrane electrode assembly and thermovoltaic potential generated by the heat applied to the low-pressure side pulls the working fluid toward the low-pressure side, thereby increasing output voltage of the second membrane electrode assembly.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings:

FIG. 1 is a graph of the Nernst equation for voltage generated by a MEA using hydrogen as the working fluid vs. temperature, for various pressure ratios;

FIG. 2 is diagram of a thermo-electrochemical converter, in accordance with an embodiment of the present invention;

DETAILED DESCRIPTION OF THE INVENTION

Figure 3:
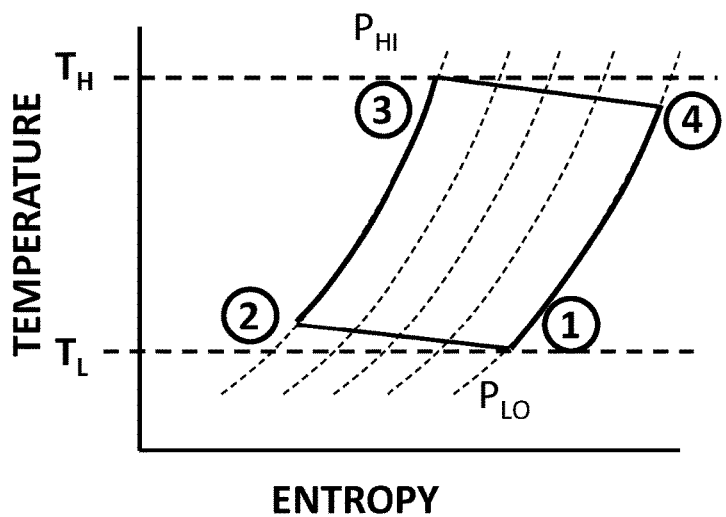
FIG. 3 is an ideal temperature entropy diagram for the Ericsson engine cycle on which the converter of FIG. 2 operates.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

Referring to the drawings in detail, wherein like numerals indicate like elements throughout the several views, FIGS. 1-7 show preferred embodiments of a heat engine including one or more MEAs, or aspects thereof. The terms "electrochemical cell," "membrane electrode assembly," "membrane electrode assembly stack," "MEA," "MEA stack," "MEA cell" and "stack" are used interchangeably herein.

Figure 7:
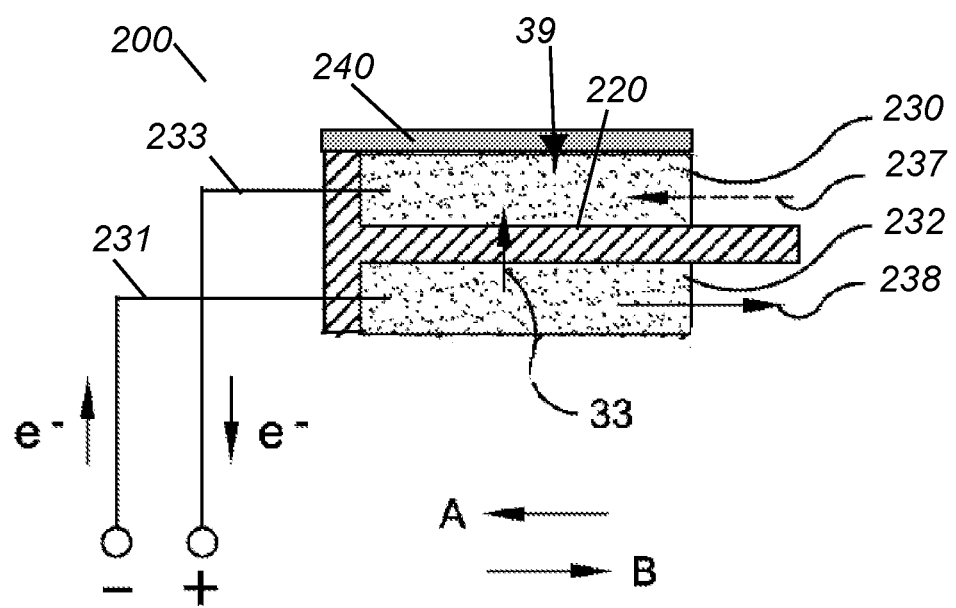
FIG. 7 is a diagram of a thermo-electrochemical converter, in accordance with an embodiment of the present invention.

Referring to FIG. 7, there is shown a thermo-electrochemical converter according to an embodiment of the present invention. The converter comprises at least one MEA 200. The MEA 200 comprises a membrane 220 sandwiched between a pair of electrodes 230, 232. It will be understood that the MEA 200 may comprise a plurality of overlapping layers of alternating electrodes 230, 232 and membranes 220 arranged in a high density stacked configuration.

The membrane 220 is preferably an ion conductive membrane or proton conductive membrane having a thickness on the order of approximately 0.1 μm to 500 μm, and more preferably between approximately 1 μm and 500 μm. More particularly, the membrane 220 is preferably made from a proton conductive material or ion conductive material, and more preferably of a material that is conductive of ions of a working fluid that passes through the MEA 200. In one embodiment, the membrane 220 is preferably formed of a material comprising polybenzimidazole, yttrium-doped barium zirconate, or titanium oxide, and more preferably polybenzimidazole or yttrium-doped barium zirconate. However, it will be understood by those skilled in the art that any material, and preferably any polymer or ceramic material, which demonstrates a similar ion conductivity over a broad temperature range may be used to form the membrane 220.

The electrodes 230, 232 preferably each has a thickness of approximately 25 μm. The electrodes 230, 232 are preferably comprised or formed of the same material as the membrane 220, such that the high thermal stresses that would otherwise occur under the extreme temperatures encountered during co-sintering or fusing to form the MEA 200 and in many end-use applications during operation of the MEA 200 are eliminated or at least reduced. However, the electrodes 230, 232 are preferably porous structures, while the membrane 220 is preferably a non-porous structure. It will be understood that the electrodes 230, 232 and the membrane 220 may be formed of different materials having similar thermal expansion coefficients, such that there would be little or no thermal stress generated during co-sintering/fusing or use of the MEA 200.

In one embodiment, the porous electrodes 230, 232 may be doped or infused with additional material(s) to provide electronic conductivity and catalytic material, in order to promote oxidation and reduction of the working fluid.

The MEA 200 further comprises a conduit system including at least one low-pressure conduit 237 (represented by dashed lines in FIG. 7) coupled to the first porous electrode 230 and at least one high-pressure conduit 238 (represented by solid lines in FIG. 7) coupled to the second porous electrode 232. A supply of an ionizable gas, preferably hydrogen, is contained within the conduit system as the working fluid. It will be understood by those skilled in the art that virtually any gas may be utilized as the working fluid (e.g., oxygen), as long as the membrane 220 is formed of a material that is conductive of ions/protons of that gas. In one embodiment, the working fluid is 100% oxygen. In another embodiment, the working fluid comprises 0.1% to 99.9% hydrogen with the balance being an inert gas.

The low-pressure conduit 237 directs the flow of the working fluid (e.g., hydrogen) in the direction of arrow A, while the high-pressure conduit 238 directs the flow of the working fluid in the direction of arrow B (i.e., the opposite direction of the low pressure conduit 237 flow). The low-pressure conduit 37 and high-pressure conduit 38 define low- and high-pressure electrodes 230, 232, respectively, and low- and high-pressure sides of the MEA 200.

The high-pressure side of the MEA 200 may be at a pressure of as low as 0.5 psi and as high as 3,000 psi. Preferably, the high-pressure side of the MEA 200 is maintained at a pressure of approximately 300 psi. The low-pressure side of the MEA 200 may be at a pressure of as low as 0.0001 psi and as high as 0.3 psi. Preferably, the low-pressure side of the MEA 200 is maintained at a pressure of approximately 0.03 psi. A preferred pressure ratio of the high-pressure side to the low pressure side is 10,000:1 (see FIG. 1).

The MEA 200 further includes at least one heat transfer member 240 coupled to the MEA 200 on the low-pressure side (i.e., the side corresponding to the low-pressure electrode 230 and the low-pressure conduit 237). The heat transfer member 240 provides a thermal interface effectively across the entire surface of the low-pressure side of the MEA 200, effectively coupling heat to and from substantially the entire surface of low-pressure side of the MEA, for example to a heat sink (not shown) or from a heat source (not shown).

First and second terminals 233 and 231 are connected to the low-pressure and high-pressure electrodes 230, 232, respectively.

In one embodiment, the MEA 200 may operate as a heat engine to expand the working fluid from high pressure to low pressure so as to generate electricity. Power may be extracted from the MEA 200 by connecting an electric load to the first and second terminals 233, 231. Electric power is produced as the pressure differential between the high- and low-pressure conduits 238, 237 forces the working fluid through the MEA 200. While under pressure, the working fluid is oxidized at the high-pressure electrode 232 connected to terminal 231, thereby releasing electrons to the high-pressure electrode 232 and causing ions of the working fluid to enter the ion conductive membrane 220 as indicated by arrows 33. With the high-pressure electrode 232 connected to an external load, electrons flow through the load to the low-pressure electrode 230, where ions exiting the membrane 220 are reduced to reconstitute the working fluid and which is coupled to the heat transfer member 240 so as to facilitate the supply of heat of expansion to the working fluid (e.g., from a heat source). The converter supplies power to the external load as pressure forces the working fluid to flow through the MEA 200.

In another embodiment, the MEA 200 is configured to operate to pump the working fluid from low pressure to high pressure creating a compression process. Electrical power is consumed by the compression process. A power source is applied across the first and second terminals 233, 231. Voltage is applied at a potential that is sufficient to force current flow by overcoming the Nernst potential generated by the MEA 200 at its operating temperature and pressure differential. The applied power strips electrons from the working fluid at the interface of the low-pressure electrode 230 and membrane 220. The resulting ions are conducted through the ion conductive membrane 220 in the direction indicated by arrow 39. The power source supplies electrons to the high-pressure electrode 232, so as to reconstitute the working fluid at the interface of the high-pressure electrode 232 and membrane 220 as ions exit the membrane 220. This current flow under the applied voltage, in effect, provides the pumping power needed for pumping the working fluid from low pressure to high pressure. The removal of the heat of compression, for example to a heat sink (not shown), is facilitated by the heat transfer member 240 coupled to the low-pressure side of the MEA 200.

Referring to FIG. 2, there is shown a thermo-electro-chemical converter according to another embodiment of the present invention. The converter operates on a combination of Nernst voltage and thermogalvanic voltage produced across two or more ion conductive membrane electrode assemblies, as described herein more fully. FIG. 3 shows the ideal temperature entropy diagram for the Ericsson engine cycle of the converter of FIG. 2. Electrical connections are not shown in FIG. 2.

Referring to FIG. 2, the converter includes a first MEA 10, a second MEA 28, a heat exchanger 26 connecting the first and second MEAs 10, 28, a working fluid which flows in a continuous loop between the first and second MEAs 10, 28, a first conduit 18 and a second conduit 20, all of which are housed in a monolithic co-sintered ceramic structure. The first and second MEAs 10, 28 of FIG. 2 are the same as the MEA 200 of FIG. 7, and thus the above description of the various components of the MEA 200 is not repeated herein as the description is equally applicable to the MEAs 10, 28 of FIG. 2.

Briefly, the first MEA 10 includes a membrane 14 which is conductive of ions of the working fluid and is sandwiched between a first, porous electrode 12 and a second, porous electrode 16. The first MEA 10 is coupled to a heat sink 5 and functions to pump the working fluid from a low pressure to a high pressure (i.e., compress the working fluid), with electrical power being consumed by the compression process and the heat of compression being rejected (heat removal is represented by arrow QL in FIG. 2). The second MEA 28 includes a membrane 24 which is conductive of ions of the working fluid and is sandwiched between a first porous electrode 30 and a second, porous electrode 22. The second MEA 28 is coupled to a heat source 7 (with the heat supply being represented by arrow QH in FIG. 2), and functions to expand the working fluid from a high pressure to a low pressure. The expansion of the working fluid through the second MEA 28 generates electricity.

The heat exchanger 26 is preferably a recuperative, counterflow heat exchanger which recuperates heat from working fluid leaving the second MEA 28 by coupling it to working fluid flowing to the second MEA 28. Providing such a recuperative heat exchanger in combination with a heat source and heat sink coupled to the high and low temperature electrochemical cells (i.e., MEA stacks) enables sufficient heat transfer for near constant temperature expansion and compression processes, thereby allowing the engine to approximate the thermodynamic Ericsson cycle.

The first conduit 18 operates at a first pressure and the second conduit 20 operates at a second pressure which is higher than the first pressure. Therefore, the first conduit 18 is referred to herein as the "low-pressure conduit 18" and the second conduit 20 is referred to herein as the "high-pressure conduit." The low-pressure conduit 18 couples the first electrodes 12, 30 of the first and second MEAs 10, 28, respectively, to enable the flow of working fluid between the first electrodes 12, 30. As such, the first electrodes 12, 30 are low-pressure electrodes, the sides of the MEAs 10, 28 corresponding to the first electrodes 12, 30 are low-pressure sides of the respective MEA 10, 28, and the side of the converter corresponding to the first electrodes 12, 30 is a low-pressure side of the converter. The high-pressure conduit 20 couples the second electrodes 16, 22 of the first and second MEA stacks 10, 28, respectively, to enable the flow of working fluid between the second electrodes 16, 22. As such, the second electrodes 16, 22 are high-pressure electrodes, the sides of the MEAs 10, 28 corresponding to the second electrodes 16, 22 are high-pressure sides of the respective MEA 10, 28, and the side of the converter corresponding to the second electrodes 16, 22 is a high-pressure side of the converter.

The high-pressure side of each MEA 10, 28 may be at a pressure of as low as 0.5 psi and as high as 3,000 psi. Preferably, the high-pressure side of each MEA 10, 28 is maintained at a pressure of approximately 300 psi. The low-pressure side of each MEA 10, 28 may be at a pressure of as low as 0.0001 psi and as high as 0.3 psi. Preferably, the low-pressure side of each MEA 10, 28 is maintained at a pressure of approximately 0.03 psi. A preferred pressure ratio of the high-pressure side to the low-pressure side of each MEA 10, 28 is 10,000:1 (see FIG. 1).

The first MEA 10 and the second MEA 28 preferably each includes at least one heat transfer member, also known as a heat conductor or heat spreader. In one embodiment, the low-pressure electrodes 12, 30 of the first and second MEAs 10, 28 include a heat transfer member. In one embodiment, the low-pressure electrodes 12, 30 themselves are structured to function as heat transfer members. In another embodiment, each of the low-pressure electrodes 12, 30 is coupled to a separate heat transfer member.

In the embodiment of FIG. 2, the low-pressure electrode 12 of the first MEA 10 is structured to function as a heat transfer member with respect to the heat sink 5 and the low-pressure electrode 30 of the second MEA 28 is structured to function as a heat transfer member with respect to the heat source 7, and thus no separate component is shown or designated as the heat transfer member. Thus, in addition to functioning as electrodes, the low-pressure electrode 12 of the first MEA 10 facilitates the transfer of heat from the first MEA 10 to the associated heat sink 5, and the low-pressure electrode 30 of the second MEA 28 facilitates the transfer of heat to the second MEA 28 from the associated heat source 7.

In one embodiment, where the converter operates as a heat engine, the heat source 7 to which the second MEA 28 is coupled is preferably at an elevated temperature relative to the temperature of the heat sink 5 to which the first MEA 10 is coupled. As such, the first MEA 10 constitutes a low-temperature, compression cell and low-temperature side of the converter, while the second MEA 28 constitutes a high-temperature, expansion cell and high-temperature side of the converter and has a higher Nernst voltage than the low-temperature cell 10. Operation of the low-temperature cell 10 is driven by electric power input with heat rejection by the first heat transfer member to the heat sink 5. Operation of the high-temperature cell 28 is driven by heat input to the second heat transfer member from the heat source 7 to produce electricity. As a result, the second MEA 28 produces an amount of electrical power that is sufficient to drive the operation of the first MEA 10 and provide net power output.

In another embodiment, where the converter functions as a heat pump application, the heat source 7 to which the second MEA 28 is coupled is preferably at reduced temperature relative to the temperature of the heat sink 5 to which the first MEA 10 is coupled. Working fluid is expanded in the second MEA 28 as the heat of expansion is extracted from the low-temperature heat source 7. Operation of the second MEA 28 is driven by heat input to the second heat transfer member from the heat source 7 to produce electricity. Working fluid is compressed at a high temperature in the first MEA 10 as the heat of compression is rejected at the elevated temperature. Operation of the first MEA 10 is driven by electric power input with heat rejection by the first heat transfer member to the heat sink 5. The first MEA 10 consumes an amount of electrical power that is greater than that produced by the second MEA 28 with net power input being required as for a heat pump.

The discussion herein focuses on the operative configuration in which the converter operates as a heat engine.

The ideal temperature entropy diagram for the Ericsson engine cycle on which the converter of FIG. 2 operates is shown in FIG. 3. The thermodynamic states 1 through 4 are identical at the respective points labeled in FIGS. 2 and 3.

Referring to FIGS. 2-3, the converter operates as follows, with the working fluid being hydrogen. However, it will be understood that another ionizable gas, such as oxygen, may instead be used as the working fluid. Beginning at low-temperature, low-pressure state 1, electrical energy $W_{IN}$ is supplied to the low-temperature MEA 10 to pump hydrogen from low-temperature, low-pressure state 1 to low-temperature, high-pressure state 2. More particularly, hydrogen is compressed in the low-temperature MEA 10, thereby driving the hydrogen from the low-pressure side of the membrane 14 to the high-pressure side. In the low-temperature MEA 10, the temperature of the hydrogen (protons) increases by a finite amount because of the heat of compression which is generated as the hydrogen transitions across membrane 14 from the low-pressure side to the high-pressure side, while simultaneously heat QL is being removed to the heat sink 5 from the low-pressure side of the membrane 14. Heat removal to the heat sink 5 is enhanced by the low-pressure electrode 12 comprising or being coupled to a heat conductive material. As a result, a temperature gradient increasing towards the high-pressure side of the low-temperature MEA 10 is maintained.

From low-temperature, high-pressure state 2, the hydrogen passes through the recuperative, counter flow heat exchanger 26 and is therein heated under approximately constant pressure to reach the temperature of state 3. More particularly, state 3 is high-temperature, high-pressure state. The heat needed to elevate the temperature of the hydrogen from low-pressure, high-temperature state 2 to high-temperature, high-pressure 3 is transferred from the hydrogen flowing in the opposite direction through the heat exchanger 26. At high-temperature, high-pressure state 3, electrical power $W_{OUT}$ is generated as hydrogen expands across the high-temperature, high-pressure MEA 28 from high pressure, high temperature state 3 to high temperature, low-pressure state 4. In the high-temperature MEA 28, the temperature of the hydrogen (protons) increases by a finite amount as heat QH is supplied from the heat source 7 to the low-pressure side of the membrane 24, facilitated by the low-pressure electrode 30 comprising or being coupled to a heat conductive material, to overcome the temperature decrease that would otherwise occur due to the heat of expansion which is generated as the hydrogen (protons) transitions to the low-pressure side across the membrane 24 from the high-pressure side. As a result, a temperature gradient increasing towards the low-pressure side of the high-temperature MEA 28 is maintained. From high-temperature, low-pressure state 4, the hydrogen passes through the recuperative, counterflow heat exchanger 26 and therein its temperature is lowered by heat transfer to the hydrogen counterflowing from low-temperature, high-pressure state 2 to high-temperature, high-pressure state 3, until the hydrogen passing from high-temperature, low-pressure state 4 reaches the temperature of low-temperature, low-pressure state 1. The hydrogen is pumped by the low-temperature MEA 10 from low-temperature, low-pressure state 1 back to low-temperature, high-pressure state 2, as described above, and so forth as the cycle continues.

Figure 4:
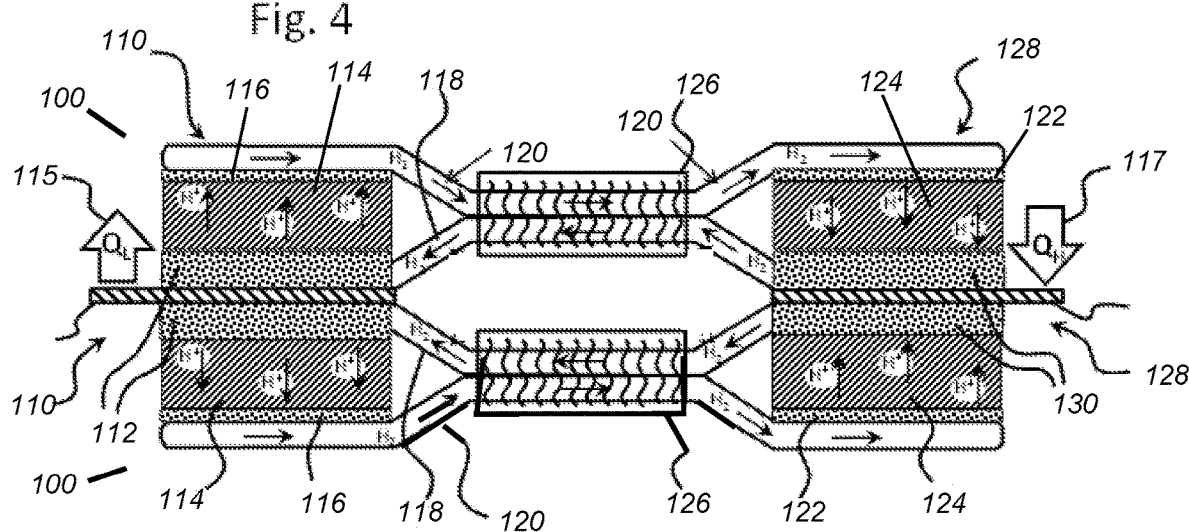
FIG. 4. is a diagram of a heat engine comprising a plurality of stacked converters, in accordance with an embodiment of the present invention.

FIG. 4 shows a converter assembly in accordance with another embodiment of the present invention, and details a specific preferred structure of the low-pressure electrodes 12, 30 as heat conductive electrodes which function as a heat sink spreader and a heat source spreader, respectively, to transfer heat from and to the respective MEAs 10, 28.

In the embodiment shown in FIG. 4, the heat engine includes two identical converters 100 arranged in a stacked configuration, although it will be understood that more than two converters 100 may be included in the assembly. The converters 100 are identical to each other and to the converter described above with respect to FIGS. 2 and 3. Accordingly, a detailed description of the configuration of each converter 100 is not necessary. Briefly stated, each converter 100 includes a first, low-temperature MEA 110 coupled to a heat sink 115 (with the heat removal being represented by arrow QL), a second, high-temperature MEA 128 coupled to a heat source 117 (with the heat supply being represented by arrow QH), a heat exchanger 126 connecting the low-temperature and high-temperature MEAs 110, 128. Each low-temperature MEA 110 includes an ion conductive membrane 114 sandwiched between a first electrode 112 and a second electrode 116. Each high-temperature MEA 128 includes an ion conductive membrane 124 sandwiched between a first electrode 130 and a second electrode 122.

Each converter 100 further includes a first conduit 118 operating at a first pressure and a second conduit 120 operating at a second pressure which is higher than the first pressure. The low-pressure conduit 118 of each converter 100 couples the first electrode 112 of the low-temperature MEA 110 with the first electrode 130 of the high-temperature MEA 128, thereby enabling the flow of working fluid between the two low-pressure electrodes 112, 130. The low-pressure electrodes 112, 130 constitute a low-pressure side of the respective MEA 110, 128 and are coupled to the heat sink 115 and heat source 117, respectively. The high-pressure conduit 120 of each converter 100 couples the second electrode 116 of the low-temperature MEA 110 with the second electrode 122 of the high-temperature MEA 128, thereby enabling the flow of working fluid between the high-temperature electrodes 116, 122. The high-temperature electrodes 116, 122 constitute a high-pressure side of the respective MEA 110, 128.

The first and second converters 100 are stacked such that the low-pressure electrodes 112, 130 of each converter 100 are arranged in a back-to-back configuration, with heat being supplied to the back-to-back low-pressure electrodes 130 of the high-temperature MEA cells 128 by the heat source 117 and heat being removed from the back-to-back low-pressure electrodes 112 of the low-temperature MEA cells 110 by the heat sink 115. As such, the low-temperature MEAs 110 constitute a low-temperature MEA stack and the high-temperature MEAs 128 constitute a high-temperature MEA stack.

In another embodiment (not shown), the low-temperature MEAs 110 and high-temperature MEAs 128 of the first and second converters 100 need not include distinct low-pressure electrodes 112, 130. Instead, the low-temperature MEAs 110 of the first and second converters 100 may be stacked on top of each other, such that adjacent MEAs 110 share a common low-pressure electrode 112, and the high-temperature MEAs 128 of the first and second converters 100 may be stacked on top of each other, such that adjacent MEAs 128 share a common low-pressure electrode 130. Similarly, the converters 100 need not have distinct low-pressure and high-pressure conduits 118, 120, but may instead share common conduits 118, 120.

A first heat transfer member 140, and more particularly a first heat conductor 140, is coupled to and arranged between adjacent low-pressure electrodes 112 of the low-temperature MEA stack 140. The first heat conductor 140 couples the low-temperature MEA stack 140 to the associated heat sink 115. A second heat transfer member 142, and more particularly a second heat conductor 142, is coupled to and arranged between adjacent low-pressure electrodes 130 of the high-temperature MEA stack 160. The second heat conductor 142 couples the high-temperature MEA stack 160 to the associated heat source 117. It will be understood that while the heat conductors 140, 142 are shown as separate components from the low-pressure electrodes 112, 130 in FIG. 4, the heat conductors 140, 142 may instead be integral components of the low-pressure electrodes 112, 130.

The first heat conductor 140 provides a thermal interface effectively across the entire surface of the low-pressure sides of the low-temperature MEAs 110 (i.e., the side corresponding to the low-pressure electrodes 112), and facilitates heat transfer from the low-temperature MEAs 110 to the heat sink 115. The second heat conductor 142 provides a thermal interface effectively across the entire surface of the low-pressure sides of the high-temperature MEAs 128 (i.e., the side corresponding to the low-pressure electrodes 130), and facilitates heat transfer from the heat source 117 to the high-temperature MEAs 128.

Operation of each converter 100 progresses in the same way as described above with respect to FIGS. 2-3 and states 1 through 4.

The first and second heat conductors 140, 142 are preferably made of a porous material, but may include non-porous sections to provide enhanced heat transfer effect. The first and second heat conductors 140, 142 may also include sections formed of a different material which provides for enhanced heat transfer effect. The first and second heat spreaders 140, 142 may be formed of practically any material which is thermally conductive. Examples of such thermally conductive material includes, but are not limited to, metals, diamond, graphite, silicon carbide, aluminum nitride, and any equivalents thereof. The first and second heat spreaders 140, 142 may be formed of the same material or mixture of materials, or of different materials or mixtures of materials.

Figure 5:
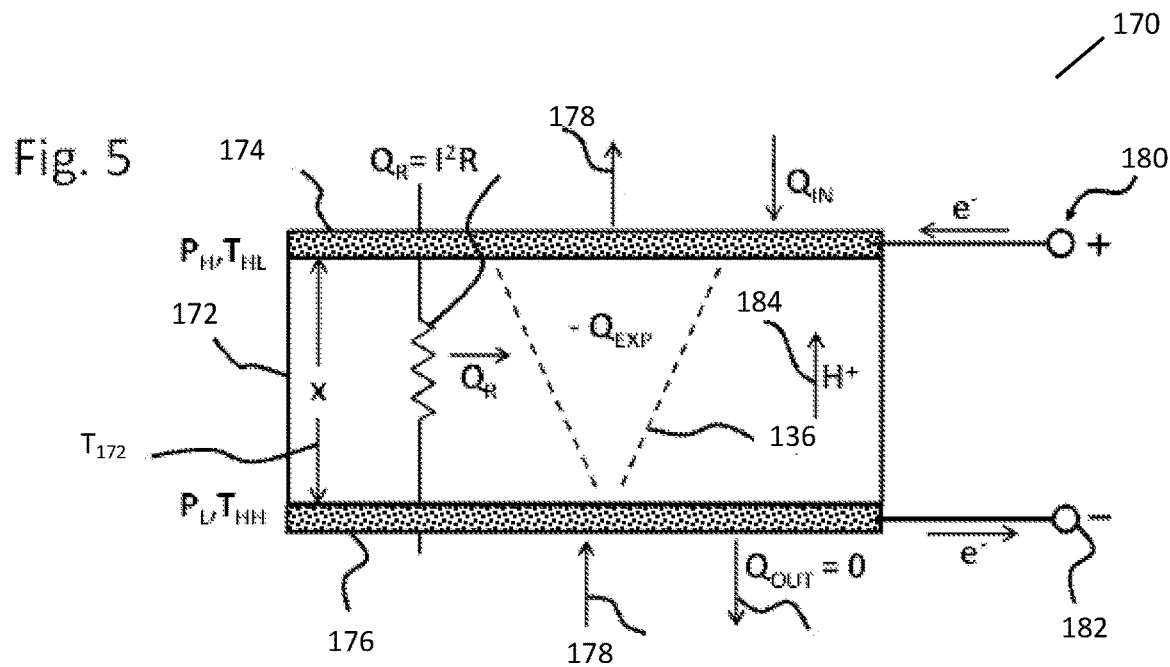
FIG. 5 is a diagram of a high-temperature MEA of a thermo-electrochemical converter, in accordance with an embodiment of the present invention.

Referring to FIG. 5, there is shown a high-temperature MEA 170 of a converter in accordance with an embodiment of the present invention. With the high-temperature MEA 170 of FIG. 5, heat input is implemented in a manner that generates galvanic voltage to increase overall converter performance. The MEA 170 includes an ion conductive membrane 172, and more particularly a proton conductive membrane 172 of a thickness $T_{172}$, sandwiched between a first, porous electrode 174 and a second, porous electrode 176. The first electrode 174 is coupled to a heat source (not shown), such that the first electrode 174 is a heated electrode. The first electrode 174 operates at a first pressure and the second electrode 176 operates at a second pressure which is higher than the first pressure. In one embodiment, the low-pressure electrode 174 comprises a material having high thermal conductivity and thus acts as a heat spreader or is coupled to a component comprising such a thermally conductive material. Hydrogen mass flow 178 enters the high-pressure electrode 176 and is oxidized. The resulting electrons are conducted through an external circuit (not shown), via first and second electrode terminals 180 and 182, while the resulting protons 184 are conducted through the proton conductive membrane 172. Internal resistive heating 186 due to proton current is designated as $Q_R$ in FIG. 5. Under the pressure differential across the MEA 170, heat which is conducted into the MEA 170 from the high-temperature side 176 is consumed by the hydrogen expanding through the membrane 172 as heat of expansion 136, $Q_{EXP}$. The protons and electrons are reduced back to hydrogen at the low-pressure electrode 174 as the circuit is completed.

The voltage produced across the MEA 170 is the result of the Nernst voltage due to the difference between high pressure $P_H$ and low pressure $P_L$. As such, it is desirable to maintain constant-temperature compression and expansion processes so as to closely approximate the Ericsson cycle. Ideally, heat output 150, $Q_{OUT}$ on the low-temperature side 176 is zero, since there is no heat sink on the entering side of the MEA, except for that associated with the entering hydrogen. Voltage losses within the MEA 170 are associated with the resistance of the membrane, hydrogen activation energy, voltage loss due to hydrogen flow pressure drops within the conduits that couple multiple MEAs back-to-back, hydrogen permeation through the membranes, and the like.

In the present invention, because the supply or removal of heat is facilitated by the heat transfer member, the temperature gradient produced with heat flux across each MEA is in a direction opposite to that of the proton conduction, and generates a thermogalvanic voltage (e.g., Seebeck voltage) across each MEA which is of opposite polarity relative to resistance voltage losses associated with the proton conduction. As such, the temperature gradient and thermogalvanic voltage locally minimize or wholly negate losses such as activation energy losses and resistivity voltage losses. For example, referring to FIG. 5, because heat is applied to one side of the MEA 170, namely the low-pressure side 174, which is coupled to a heat transfer member or which includes a heat transfer member, the temperature gradient produced with heat flux across the MEA 170 is in a direction opposite to that of the proton conduction, and generates a thermogalvanic voltage (e.g., Seebeck voltage) across the MEA 170 which is of opposite polarity relative to resistance voltage losses associated with the proton conduction. As such, the temperature gradient and thermogalvanic voltage locally minimize or wholly negate losses such as activation energy losses and resistivity voltage losses.

Figure 6:
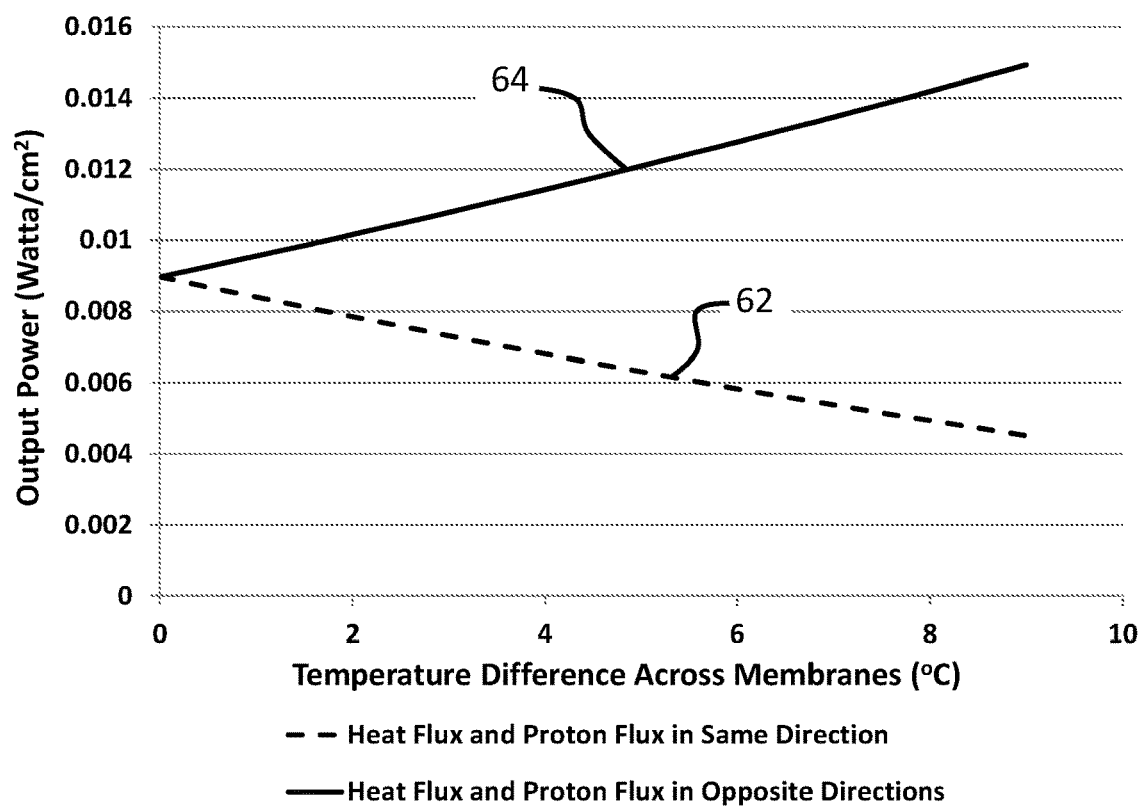
FIG. 6 is a diagram reflecting the power density changes with respect to temperature difference across different thermo-electrochemical converter configurations.

FIG. 6 depicts the results a modeling analysis of a complete thermoelectrochemical converter, in accordance with the present invention, including both high- and low-temperature MEA cells showing effects of the heat spreaders location. The representative converter operates on a 150° C. heat source and a 50° C. heat sink. The membrane of the converter analyzed for the graph of FIG. 6 comprised phosphoric acid-based polybenzimizole as a proton conductive membrane material. The membrane had an ionic conductivity of 0.056 S/cm at 50° C. and 0.355 S/cm at 150° C. The model allocates 70% of the theoretical Nernst open circuit voltage of the two MEAs, arranged in a back-to-back configuration, as output voltage to a load, with the remaining 30% being consumed by internal losses. Under this condition, maximum possible output current is constrained to a level such that losses associated with resistance, hydrogen flow, activation energy, and the like can be accommodated within the 30% of the open circuit voltage, thus achieving 70% of Carnot output efficiency. The model predicts output power density under the 70% of Carnot output efficiency constraint.

The configuration represented by line 64, in which the heat flux is in the opposite direction of the ion flux, has improved power density as compared to the configuration of line 62, in which the heat flux is in the same direction as the ion flux. FIG. 6 reflects that the power density changes significantly with just a few degrees temperature difference across the membranes. Note that when there is no temperature gradient, the power output is 9 mW/cm² and both models are at the same power level. However, as temperature gradients develop across the membranes of both MEAs, the two configurations diverge in performance. Line 62 shows the output power density for the case where the heat flux is in the same direction as that of the hydrogen or proton flux through each MEA. On the other hand, line 64 shows the case where heat is input and extracted from each MEA in a manner that produces heat flux in a direction that is opposite to the direction of the proton or hydrogen flux, as in the present invention.

The changes in power output occur because of the additive or subtractive nature of the thermogalvanic voltage produced across the MEAs, depending on whether the heat flux in the opposite direction or same direction as the working fluid flow, respectively. In the configuration represented by line 64, which is representative of the present invention, at the low temperature MEA, heat is extracted on the low-pressure side and the low-pressure side is maintained at a relatively low temperature. Heat of compression is generated as the working fluid (e.g., hydrogen) is moved across the MEA to the high-pressure side by the applied pumping voltage. The resulting heat of compression is conducted in the opposite direction back to the low-pressure side. The net result is that the thermogalvanic voltage tends to move the working fluid in the same direction as the voltage being applied to the cell to produce pumping. The resulting two voltages combine overcome the Nernst potential defined by the temperature and pressure ratio of the MEA, which results in a lower input voltage being needed to achieve the desired pumping.

On the other hand, in the configuration represented by line 64, thermogalvanic voltage is generated at the high-temperature MEA, in addition to the cell's Nernst potential, which results in a higher output voltage than would be realized by the Nernst potential alone. At the high-temperature MEA, heat is input on the low-pressure side such that the resulting heat flux into the MEA is in the opposite direction of the working fluid expanding through the MEA from the high-pressure side to the low-pressure side. Pressure forces the working fluid through the MEA, stripping off electrons to the external circuit (load and low-temperature MEA) with protons being conducted through the membrane. The thermovoltaic potential generated by heat applied to the low-pressure side has the same effect. The thermovoltaic potential pulls the working fluid to the low-pressure side. This voltage is additive to the Nernst voltage. The combination results in higher overall high-temperature MEA output voltage.

The combination of these two effects at the low-temperature and high-temperature MEAs, that is lower voltage being needed to drive the low-temperature MEA compression and higher output voltage being generated by the high-temperature MEA, results in a higher amount of system level voltage being available for overcoming internal losses, particularly those associated with membrane impedance.

In contrast to the present invention, operation of the converter when the heat flux is in the same direction of the proton (hydrogen) flux results in lower overall system voltage output because thermovoltaic voltage operates in opposition to the Nernst voltages, under this condition, rather than being additive to the Nernst voltages. The decreasing voltage of line 62 in FIG. 6 is illustrative of such a configuration. In the configuration represented by line 62 in FIG. 6, heat is extracted from the low-temperature MEA from the high-pressure side, rather than the low-pressure side. Under this condition, the low-pressure side of the MEA is the side to which working fluid is being compressed. The resulting thermovoltaic potential tends to move the working fluid toward the higher temperature, low-pressure side in opposition to the voltage being applied to pump the working fluid to the high-pressure side. Thus, the applied voltage must be high enough to overcome both the thermovoltaic potential created by the applied temperature gradient and the Nernst voltage in performing the low-temperature MEA compression process. Similarly, supplying heat on the high-pressure side of the high-temperature MEA creates a thermovoltaic potential that tends move the working fluid toward the high-pressure side in opposition to expansion of working fluid from the high-pressure side. The net effect is to reduce the output voltage of the MEA.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A thermo-electrochemical converter comprising:
    a working fluid;
    a first membrane electrode assembly and a second membrane electrode assembly coupled to the first membrane electrode assembly, each of the first and second membrane electrode assemblies including a first porous electrode operating at a first pressure, a second porous electrode operating at a second pressure which is higher than the first pressure, and an ion conductive membrane sandwiched therebetween, the first membrane electrode assembly working to compress the working fluid and the second membrane electrode assembly working to expand the working fluid;
    a first conduit containing the working fluid and operating at a first pressure and a second conduit containing the working fluid and operating at a second pressure which is higher than the first pressure, the first conduit being coupled to the first porous electrodes of each of the first and second membrane assemblies to enable the flow of the working fluid between the first porous electrodes, the second conduit being coupled to the second porous electrodes of each of the first and second membrane assemblies to enable the flow of the working fluid between the second porous electrodes;
    a first heat transfer member coupled to the first porous electrode of the first membrane electrode assembly, the first heat transfer member thermally interfacing with and facilitating heat transfer from a surface constituting a low-pressure side of the first membrane electrode assembly;
    a second heat transfer member coupled to the first porous electrode of the second membrane electrode assembly, the second heat transfer member thermally interfacing with and facilitating heat transfer to a surface constituting a low-pressure side of the second membrane electrode assembly;
    a heat sink coupled to the low-pressure side of the first membrane electrode assembly; and
    a heat source coupled to the low-pressure side of the second membrane electrode assembly.

2. The thermo-electrochemical converter according to claim 1,
    wherein, in a first operative configuration of the converter functioning as a heat engine, an operating temperature of the first membrane electrode assembly is lower than an operating temperature of the second membrane electrode assembly, operation of the first membrane electrode assembly is driven by electric power input with heat rejection by the first heat transfer member to the heat sink, operation of the second membrane electrode assembly is driven by heat input to the second heat transfer member from the heat source to produce electricity, and the second membrane electrode assembly produces an amount of electrical power that is sufficient to drive the operation of the first membrane electrode assembly and provide net power output; and
    wherein, in a second operative configuration of the converter functioning as a heat pump, the operating temperature of the first membrane electrode assembly is higher than the operating temperature of the second membrane electrode assembly, operation of the first membrane electrode assembly is driven by electric power input with heat rejection by the first heat transfer member to the heat sink, operation of the second membrane electrode assembly is driven by heat input to the second heat transfer member from the heat source to produce electricity, and the first membrane electrode assembly consumes an amount of electrical power that is greater than that produced by the second membrane electrode assembly with net power input being required as for a heat pump.

3. The thermo-electrochemical converter according to claim 1, wherein the first and second membrane electrode assemblies are coupled to each other, such that the first membrane electrode assembly supplies compressed working fluid to the second membrane electrode assembly, and the second membrane electrode assembly supplies expanded working fluid to the first membrane electrode assembly.

4. The thermo-electrochemical converter according to claim 3, wherein the compressed working fluid is supplied from the second electrode of the first membrane electrode assembly to the second electrode of the second membrane electrode assembly, and wherein the expanded working fluid is supplied from the first electrode of the second membrane electrode assembly to the first electrode of the first membrane electrode assembly.

5. The thermo-electrochemical converter according to claim 1, further comprising an external power source connected to the first porous electrodes and the second porous electrodes, wherein power being applied to the electrodes and driving working fluid flow as electron flow forced by the external power source induces ion conductivity through the membrane of each of the first and second membrane electrode assemblies.

6. The thermo-electrochemical converter according to claim 1, wherein at the first membrane electrode assembly, heat is extracted on the low-pressure side and heat of compression is generated as the working fluid moves across the first membrane electrode assembly to a high-pressure side by an applied pumping voltage, wherein the heat of compression is conducted in a direction toward the low-pressure side of the first membrane electrode assembly, such that thermogalvanic voltage moves the working fluid in the same direction as the voltage being applied to the first membrane electrode assembly to produce pumping of the working fluid from the low-pressure side to the high-pressure side.

7. The thermo-electrochemical converter according to claim 1, wherein at the second membrane electrode assembly, heat is applied to the low-pressure side such that a resulting heat flux into the second membrane electrode assembly is in a direction opposite to a direction of the working fluid expanding through the second membrane electrode assembly from the high-pressure side to the low-pressure side, and wherein thermovoltaic potential generated by the heat applied to the low-pressure side pulls the working fluid toward the low-pressure side, thereby increasing output voltage of the second membrane electrode assembly.

* * * * *